(12) United States Patent
Matsuoka et al.

(10) Patent No.: US 8,310,639 B2
(45) Date of Patent: Nov. 13, 2012

(54) ACTIVE MATRIX TYPE LIQUID CRYSTAL DISPLAY DEVICE HAVING FIRST PIXEL SIGNAL LINES WIDER THAN SECOND PIXEL SIGNAL LINES

(75) Inventors: Akira Matsuoka, Hita (JP); Kikuo Ono, Mobara (JP)

(73) Assignees: Hitachi Displays, Ltd., Chiba-ken (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 446 days.

(21) Appl. No.: 12/285,738

(22) Filed: Oct. 14, 2008

(65) Prior Publication Data

US 2009/0051838 A1 Feb. 26, 2009

Related U.S. Application Data

(62) Division of application No. 11/038,232, filed on Jan. 21, 2005, now Pat. No. 7,453,539.

(30) Foreign Application Priority Data

Jan. 28, 2004 (JP) ................................ 2004-019905

(51) Int. Cl.
*G02F 1/1343* (2006.01)
(52) U.S. Cl. ......... 349/139; 349/141; 349/144; 349/145
(58) Field of Classification Search .................. 349/39, 349/141, 139, 144–145
See application file for complete search history.

(56) References Cited

U.S. PATENT DOCUMENTS

| | | | | |
|---|---|---|---|---|
| 5,946,067 A | * | 8/1999 | Kim et al. | 349/141 |
| 6,462,799 B2 | | 10/2002 | Ohta et al. | |
| 6,646,706 B2 | * | 11/2003 | Lim et al. | 349/141 |
| 7,119,869 B2 | * | 10/2006 | Kim et al. | 349/123 |
| 7,256,853 B2 | * | 8/2007 | Ono et al. | 349/141 |
| 7,646,439 B1 | * | 1/2010 | Choi et al. | 349/27 |
| 2004/0201807 A1 | * | 10/2004 | Ong | 349/129 |

* cited by examiner

*Primary Examiner* — Lauren Nguyen
(74) *Attorney, Agent, or Firm* — Stites & Harbison, PLLC; Juan Carlos A. Marquez, Esq

(57) ABSTRACT

A display device with a plurality of gate signal lines extended in the first direction; a plurality of drain signal lines extended in the second direction; a plurality of pixel regions in a state that each pixel region includes a switching device, a pixel electrode which is connected with the drain signal line and a counter electrode. The counter electrode is formed with respect to the pixel electrode by way of an insulation film and is formed every pixel. The pixels include first pixels and second pixels, wherein only the first pixels have a counter voltage signal line which extends in the first direction, and the counter voltage signal line is connected with the counter electrodes in the first pixels. Further, the counter electrodes of the first pixels and the counter electrodes of the second pixels are electrically connected with each other using conductive stride over the gate signal line.

5 Claims, 8 Drawing Sheets

LINE GATHERING AREA

ACTIVE MATRIX TYPE LIQUID CRYSTAL DISPLAY DEVICE HAVING FIRST PIXEL SIGNAL LINES WIDER THAN SECOND PIXEL SIGNAL LINES

CROSS REFERENCE TO RELATED APPLICATIONS

This application is a Divisional of nonprovisional U.S. application Ser. No. 11/038,232 filed on Jan. 21, 2005 now U.S. Pat. No. 7,453,539 . Priority is claimed based on U.S. application Ser. No. 11/038,232 filed on Jan. 21, 2005, which claims the priority of Japanese Application 2004-019905 filed on Jan. 28, 2004, all of which is incorporated by reference.

BACKGROUND OF THE INVENTION

1. Field of the Invention

The present invention relates to a display device and a driving method thereof.

2. Description of the Related Art

With respect to a liquid crystal display device which constitutes one example of a display device, there has been known a type of liquid crystal display device which forms a pixel electrode and a counter electrode in each pixel region on a surface of one substrate which faces a liquid crystal side in an opposed manner.

This type of liquid crystal display device is required to supply a signal which becomes the reference to the counter electrodes and hence, the liquid crystal display device is configured such that it is necessary to arrange counter voltage signal lines which constitute signal lines for the signal together with gate signal lines and drain signal lines which become necessary to drive the respective pixels (see U.S. Pat. No. 6,462,799).

In this case, it is necessary to arrange the drain signal lines such that the drain signal lines intersect the counter voltage signal lines and hence, a drawback attributed to the increase of a so-called crossing capacitance has been pointed out.

On the other hand, there has been known a technique in U.S. Pat. No. 6,646,706 in which the counter voltage signal line is formed in common with respect to the neighboring respective pixels so as to reduce the number of counter voltage signal lines.

SUMMARY OF THE INVENTION

However, when the counter voltage signal line is formed in common with respect to the neighboring respective pixels as mentioned above, the counter electrodes are inevitably configured to be connected with only the above-mentioned counter voltage signal line and hence, the connection of these counter electrodes with counter electrodes of pixels to which other counter voltage signal line is provided cannot be established.

It is because that to largely alleviate the time constant of the signal supplied to the counter voltage signal line, it is desirable to electrically connect the counter electrode with the electrodes of the pixels which are arranged in the left-and-right directions as well as in the up-and-down directions.

Further, so long as the counter voltage signal line is formed in common with respect to the neighboring respective pixels, due to the restriction that the counter voltage signal line is arranged every one other line with respect to a pixel group formed of pixels which are arranged in parallel in the extending direction of the counter voltage signal line, it is difficult to arrange the counter voltage signal line every two other lines or every three other lines.

The present invention has been made under such circumstances. It is an advantage of the present invention to provide a liquid crystal display device which is configured such that each counter electrode can be electrically connected with counter electrodes of respective pixels arranged at the left and right sides as well as at the upper and lower sides of the counter electrode.

Further, another advantage of the present invention is to provide a liquid crystal display device which can arrange counter voltage signal lines which supply a signal to counter electrodes every one other line or every two or more other lines with respect to a pixel group of respective pixels which are arranged in parallel in the extending direction of the counter voltage signal lines.

To briefly explain the summary of the typical inventions among the inventions disclosed in this specification, they are as follows.

(1)

The liquid crystal display device according to the present invention includes, for example, first and second substrates with a liquid crystal layer therebetween, a plurality of gate signal lines which are formed on the first substrate and are extended in the first direction, a plurality of drain signal lines which are formed on the first substrate and are extended in the second direction, and a plurality of pixel regions which are formed on the first substrate in a state that each pixel region includes a switching device, a pixel electrode which is connected with the drain signal line and a counter electrode, wherein the counter electrode is formed on the substrate side with respect to the pixel electrode by way of an insulation film and is formed every pixel, the pixels include first pixels and second pixels, wherein only the first pixels out of the first pixels and the second pixels have a counter voltage signal line which extends in the first direction, and the counter voltage signal line is connected with the counter electrodes in the inside of the first pixels, and the counter electrodes of the first pixels and the counter electrodes of the second pixels are electrically connected with each other using conductive layers which are formed in a state that the conductive layers stride over the gate signal lines.

(2)

The liquid crystal display device according to the present invention is, for example, on the premise of the constitution (1), characterized in that the first pixels and the second pixels are alternately arranged in the second direction.

(3)

The liquid crystal display device according to the present invention is, for example, on the premise of the constitution (1), characterized in that the extending direction of the pixel electrodes or slits formed in the pixel electrodes assumes the direction which makes an acute angle with respect to the gate signal lines.

(4)

The liquid crystal display device according to the present invention is, for example, on the premise of the constitution (1), characterized in that the number of pixel electrodes in the first pixel or the number of slits formed in the pixel electrode is smaller than the number of pixel electrodes in the second pixel or the number of slits formed in the pixel electrode.

(5)

The liquid crystal display device according to the present invention is, for example, on the premise of the constitution (1), characterized in that a distance of a pair of gate signal lines which are arranged above and below and close to the counter electrodes of the first pixels is set larger than a distance of gate signal lines which are arranged above and below and close to the counter electrodes of the second pixels.

(6)

The liquid crystal display device according to the present invention is, for example, on the premise of the constitution (5), characterized in that the number of pixel electrodes in the first pixel or the number of slits formed in the pixel electrode is equal to the number of pixel electrodes in the second pixel or the number of slits formed in the pixel electrode.

(7)

The liquid crystal display device according to the present invention is, for example, on the premise of the constitution (5), characterized in that some of the gate signal lines have bent portions at portions thereof which extend over a display region, and the distance between the gate signal line and another neighboring gate signal line is set to a fixed value by the bent portions.

(8)

The liquid crystal display device according to the present invention is, for example, on the premise of the constitution (1), characterized in that the polarity of a drain signal supplied to the drain signal lines differs between a range from the first pixel to a portion of the second pixel immediately before the next first pixel and a range from the next first pixel to a portion of the second pixel immediately before the still next first pixel.

(9)

The liquid crystal display device according to the present invention includes, for example, first and second substrates with a liquid crystal layer therebetween, a plurality of gate signal lines which are formed on the first substrate and are extended in the first direction, a plurality of drain signal lines which are formed on the first substrate and are extended in the second direction, and a plurality of pixel regions which are formed on the first substrate in a state that each pixel region includes a switching device, a pixel electrode which is connected with the drain signal line and a counter electrode, wherein the counter electrode is formed on the substrate side with respect to the pixel electrode by way of an insulation film and is formed every pixel, the pixels include first pixels and second pixels, wherein only the first pixels out of the first pixels and the second pixels have a counter voltage signal line which extends in the first direction, and the counter voltage signal line is connected with the counter electrodes in the inside of the first pixels, the counter electrodes of the first pixels and the counter electrodes of the second pixels are electrically connected with each other using conductive layers which are formed in a state that the conductive layers stride over the gate signal lines, and the drain signal line has a width thereof set larger in the second pixel than in the first pixel.

(10)

The liquid crystal display device according to the present invention is, for example, on the premise of the constitution (9), characterized in that the first pixels and the second pixels are alternately arranged in the second direction.

(11)

The liquid crystal display device according to the present invention is, for example, on the premise of the constitution (9), characterized in that the extending direction of the pixel electrodes or slits formed in the pixel electrodes assumes the direction which makes an acute angle with respect to the gate signal lines.

(12)

The liquid crystal display device according to the present invention is, for example, on the premise of the constitution (9), characterized in that the number of pixel electrodes in the first pixel or the number of slits formed in the pixel electrode is smaller than the number of pixel electrodes in the second pixel or the number of slits formed in the pixel electrode.

(13)

The liquid crystal display device according to the present invention is, for example, on the premise of the constitution (9), characterized in that the polarity of a drain signal supplied to the drain signal lines differs between a range from the first pixel to a portion of the second pixel immediately before the next first pixel and a range from the next first pixel to a portion of the second pixel immediately before the still next first pixel.

(14)

The driving method of a display device according to the present invention is, for example, characterized in that the display device includes first pixels which have a counter voltage signal line and second pixels which have no counter voltage signal line, the first pixels and the second pixels are periodically arranged in the extending direction of drain signal lines, a period ranges from one first pixel to the second pixel immediately before the next first pixel, and a signal applied to the drain signal lines has a polarity thereof changed every period.

(15)

The driving method of a display device according to the present invention is, for example, on the premise of the constitution (14), the polarity is a polarity with respect to a potential of the counter voltage signal line.

Here, the present invention is not limited to the above-mentioned constitution and various modifications can be made without departing from the technical concept of the present invention.

DETAILED DESCRIPTION OF THE INVENTION

Hereinafter, embodiments of the liquid crystal display device of the present invention are explained in conjunction with drawings.
Embodiment 1

Figure 7:
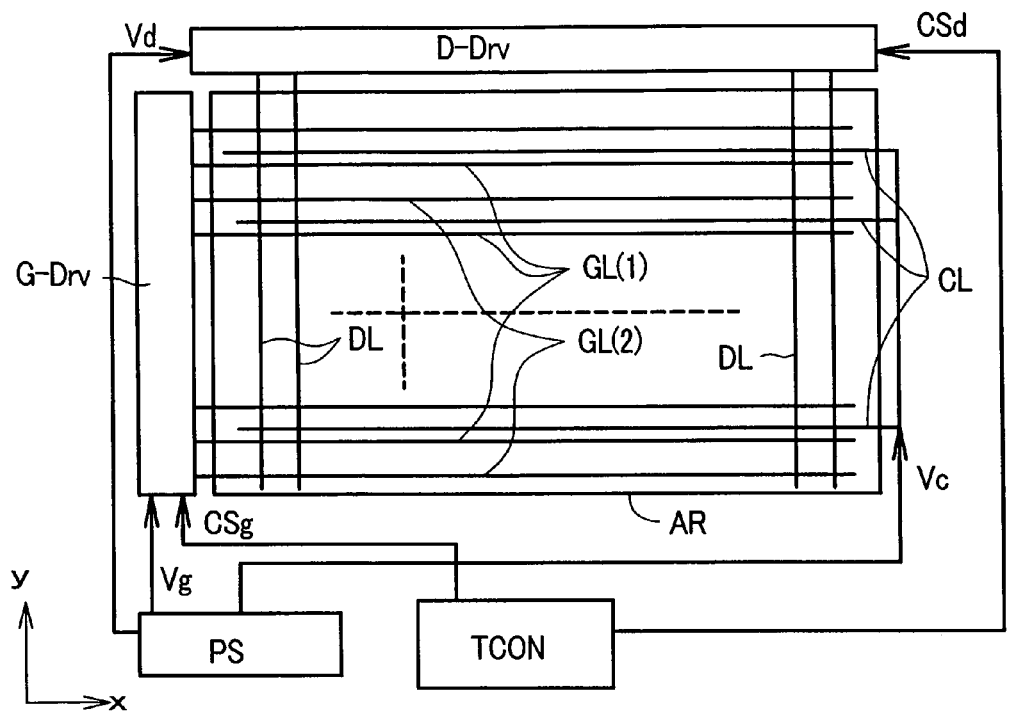
FIG. 7 is a circuit diagram showing one embodiment of the liquid crystal display device according to the present invention.

FIG. 7 is a schematic plan view showing one embodiment of the whole of a liquid crystal display device according to the present invention. The drawing shows a circuit which is formed on a liquid-crystal-side surface of one transparent substrate SUB1 out of respective transparent substrates which are arranged to face each other by way of liquid crystal.

On a front surface of the transparent substrate SUB1, respective regions which are surrounded by gate signal lines GL which extend in the x direction and are arranged in parallel in the y direction and drain signal lines DL which extend in the y direction and are arranged in parallel in the x direction are defined as pixel regions and a mass of these pixel regions constitute a liquid crystal display part AR.

Although the detailed structure of the pixel region is described later, out of these respective pixel regions, with respect to pixel groups each of which is constituted of the pixel regions arranged in parallel in the x direction, counter voltage signal lines CL are formed to run in the inside of the pixel groups which are arranged every one other in the y direction.

The counter voltage signal lines CL are signal lines for supplying a voltage signal which becomes the reference with respect to a video signal supplied to the pixel electrodes PX in the inside of the respective pixels to the counter electrodes CT in the inside of the pixels. Originally, the counter voltage signal lines CL are formed to run in the respective pixel groups each of which is arranged in parallel in the x direction, in this embodiment, as described above, the counter voltage signal lines CL are formed to run in the inside of the pixel groups which are arranged every one other in the y direction. This arrangement is provided for reducing an intersecting capacity of the drain signal lines DL with respect to the counter voltage signal lines CL.

To the above-mentioned respective gate signal lines GL, a scanning signal is sequentially supplied from a gate driver G-Drv by scanning, while a video signal is supplied to the respective drain signal lines DL from the drain driver D-Drv in conformity with the timing of scanning.

Each pixel region is provided with a thin film transistor TFT which is turned on with the supply of the scanning signal from the gate signal line GL and a pixel electrode PX to which the video signal is supplied from the drain signal line DL via the thin film transistor TFT. The video signal (voltage) which is supplied to the pixel electrode PX generates an electric field together with a counter voltage signal (voltage) supplied to the counter electrode CT and the optical modulation of the liquid crystal is controlled in response to the electric field.

Here, the gate driver G-Drv and the drain driver D-Drv are configured to supply the scanning signal and the video signal upon receiving the signals from a power source circuit PS and a liquid crystal display control circuit TCON.

Figure 1A:
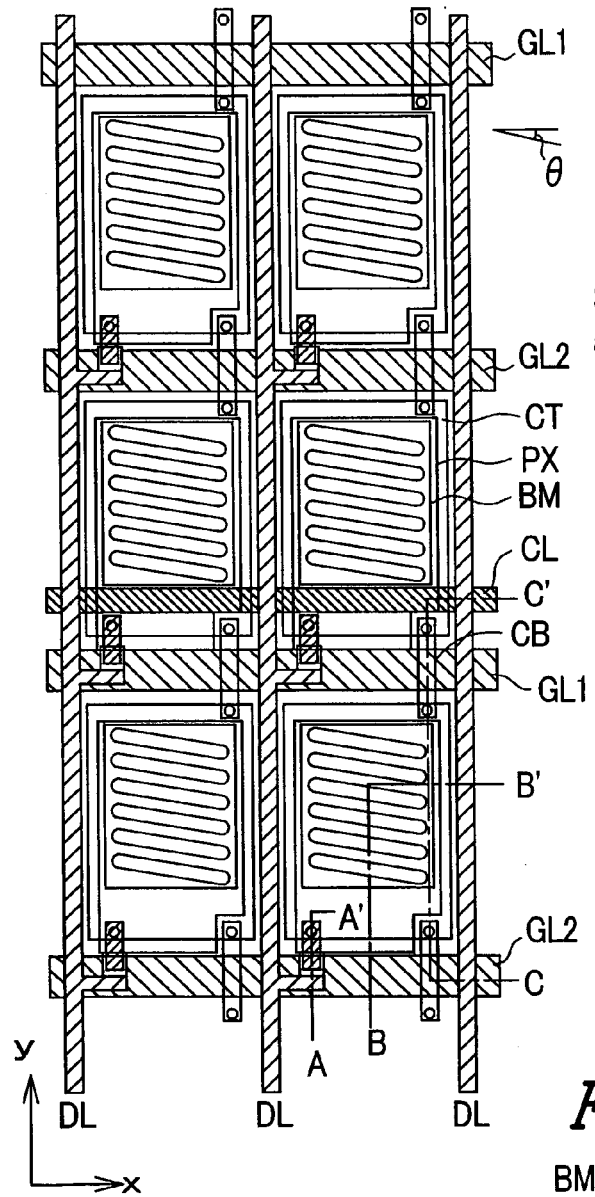
FIG. 1A, FIG. 1B, FIG. 1C and FIG. 1D are constitutional views showing one embodiment of the constitution of a pixel of a liquid crystal display device according to the present invention.

FIG. 1A is a plan view showing one embodiment of the constitution of the pixels and depicts the pixels by extracting 2×3 pieces of pixels out of the respective pixels arranged in a matrix array.

Figure 1B:
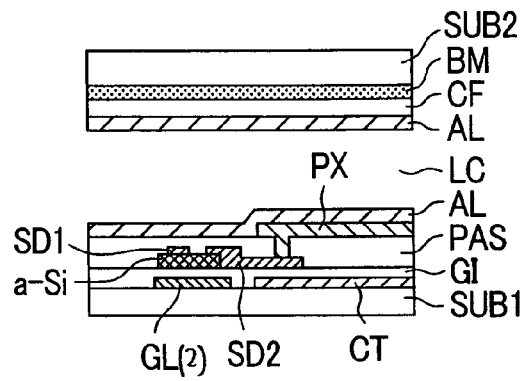
Figure 1C:
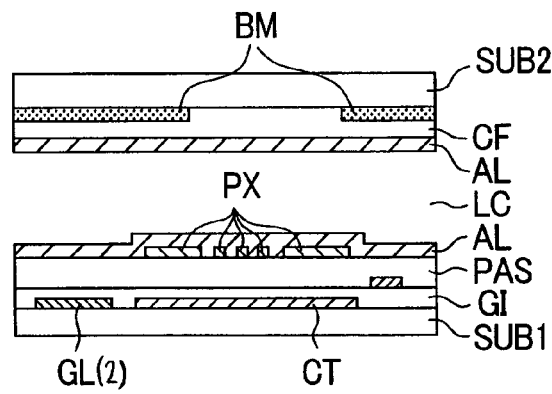
Figure 1D:
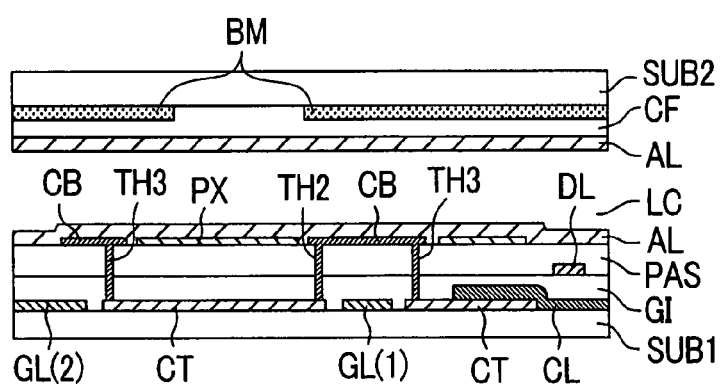

Further, respective cross-sectional views taken along lines A-A', B-B' and C-C' shown in FIG. 1A are respectively shown in FIG. 1B, FIG. 1C and FIG. 1D.

On the liquid-crystal-side surface of the transparent substrate SUB1, the gate signal lines GL which extend in the x direction and are arranged in parallel in the y direction are formed.

These respective gate signal lines GL are configured to surround rectangular regions together with the drain signal lines DL described later and these regions constitute the pixel regions.

Here, in the inside of a region of the pixel which is positioned at the center of the drawing, the counter voltage signal line CL which extends in the x direction is configured to be formed simultaneously with the formation of the respective gate signal lines GL, for example. In this case, the counter voltage signal line CL is formed to be arranged close the gate signal line GL on one side (the lower side in the drawing) so as to prevent the counter voltage signal line CL from traversing the center of the pixel region. This provision is made to avoid the reduction of the so-called numerical aperture of the pixel.

The counter voltage signal line CL is not formed in the inside of the pixels which are positioned on the immediate upper side and the immediate lower side with respect to the pixel in which the counter voltage signal line is formed. That is, as mentioned above, in the respective pixels which are arranged in the matrix array, the counter voltage signal lines CL are arranged in parallel every one other pixel, for example, in the extending direction of the drain signal lines DL.

The counter electrode CT is formed on the transparent substrate SUB1 at each pixel region, wherein the counter electrode CT is formed of a light-transmitting conductive layer which is made of, for example, ITO (Indium Tin Oxide), ITZO (Indium Tin Zinc Oxide), IZO (Indium Zinc Oxide), $SnO_2$ (Tin Oxide) or $In_2O_3$ (Indium Oxide), wherein the counter electrode CT is formed on the whole area of the center portion excluding a trivial peripheral portion of the pixel region.

In this case, the counter electrode CT which is formed in the inside of the pixel in which the counter voltage signal line CL is arranged is directly overlapped to the counter voltage signal line CL and is electrically connected with the counter voltage signal line CL. On the other hand, the counter electrodes CT which are formed in the inside of the pixels which are arranged immediately above and immediately below the above-mentioned pixel in the drawing are formed in an electrically isolated state at this stage. However, as can be understood from the explanation made later, these counter electrodes CT are configured to assume a state in which these counter electrodes CT are also electrically connected with the counter voltage signal line CL.

On the surface of the transparent substrate SUB1 on which the gate signal lines GL, the drain signal lines DL and the counter electrodes CT are formed, an insulation film GI which is made of SiN, for example, is formed in a state that the insulation film GI also covers the gate signal lines GL and the like.

The insulation film GI has several functions including a function as an interlayer insulation film with respect to the gate signal lines GL in the regions where the drain signal lines DL described later are formed and a function as a gate insulation film in regions where the thin film transistors TFT are formed as described later.

Then, on a surface of the insulation film GI, semiconductor layers AS made of amorphous Si, for example, are formed in a state that the semiconductor layers AS are overlapped to portions of the gate signal lines GL.

The semiconductor layer AS is a semiconductor layer of the thin film transistor TFT. By forming a drain electrode SD1 and a source electrode SD2 on an upper surface of the thin film transistor TFT, it is possible to constitute an MIS type transistor having the inversely staggered structure which uses a portion of the gate signal line as the gate electrode.

Here, the drain electrodes SD1 and the source electrodes SD2 are formed simultaneously with the formation of the drain signal lines DL.

That is, the drain signal lines DL which extend in the y direction and are arranged in the x direction are formed, the drain electrodes SD1 are formed by extending portions of the drain signal lines DL to upper surfaces of the semiconductor layers AS, and the source electrodes SD2 are formed in a spaced-apart manner from the drain electrodes SD1 by a distance corresponding to a channel length of the thin film transistors TFT.

The source electrodes SD2 are electrically connected with the pixel electrodes PX which are formed on an upper surface of a protective film PAS explained hereinafter, wherein end portions of the source electrodes SD2 are slightly extended into the inside of the pixel regions and constitute contact portions.

The protective film PAS is formed as a sequentially laminated body made of an organic material and an inorganic material, for example, on the upper surface of the transparent substrate SUB1 in a state that the protective film PAS also covers the thin film transistors TFT. The protective film PAS is provided for avoiding the direct contact of the thin film transistors TFT with the liquid crystal.

Then, in each pixel region, the pixel electrode PX is formed on an upper surface of the protective film PAS, and the pixel electrode PX is formed of a light-transmitting conductive layer which is made of, for example, ITO (Indium Tin Oxide), ITZO (Indium Tin Zinc Oxide), IZO (Indium Zinc Oxide), $SnO_2$ (Tin Oxide) or $In_2O_3$ (Indium Oxide). The pixel electrode PX is constituted of an electrode group in which a plurality of strip-like electrodes which make an angle θ with respect to the gate signal lines GL are arranged in parallel in the extending direction of the drain signal line DL.

Here, the respective electrodes of the electrode group are electrically connected with each other by a conductive layer made of the same material which is integrally formed with the electrode group in a peripheral portion of the pixel region.

Accordingly, the pixel electrode PX is formed in a pattern in which a plurality of slits which make an angle θ with respect to the gate signal lines GL are formed in a conductive layer formed on the center portion of the pixel region except for the periphery thereof in the extending direction of the drain signal lines DL.

Further, the pixel electrode PX is, at a portion of a periphery thereof, connected with the source electrode SD2 of the thin film transistor TFT via a through hole which is preliminarily formed in the protective film PAS which is arranged below the pixel electrode PX.

Here, the panel-like pixel electrode PX in which the slits are formed is formed in a state that an outer profile thereof is displaced from an outer profile of the counter electrode CT and hence, a portion of the peripheral portion of the counter electrode CT has a portion which projects from the pixel electrode PX. The pixel electrode PX is configured to be electrically connected with the counter electrode CT of the neighboring another pixel (the neighboring pixel in the extending direction of the drain signal line DL) at such a projecting portion.

That is, in the respective pixels which are arranged close to each other in the extending direction of the drain signal line DL, a conductive layer CB is formed in a state that the conductive layer CB strides over a portion of the gate signal line GL, one end of the conductive layer CB on a lower-pixel side in the drawing, for example, with respect to the gate signal line GL is connected with the counter electrode CT of the pixel via the through hole which penetrates the protective film PAS and the insulation film GI arranged below the pixel, while another end of the conductive layer CB on an upper-pixel side in the drawing with respect to the gate signal line GL is connected with the counter electrode CT of the pixel via the through hole which penetrates the protective film PAS and the insulation film GI arranged below the pixel.

For each pixel, the conductive layer CB is provided on respective pixel sides which are respectively positioned at upper and lower portions in the extending direction of the drain signal line DL. Due to such a constitution, the counter electrodes CT of the respective pixels which are arranged in parallel in the y direction are electrically connected by the conductive layers CB and the counter voltage signal is supplied to these respective counter electrodes CT through the counter voltage signal lines CL which are intermittently arranged in the y direction.

Here, the conductive layers CB are made of the same material as the pixel electrodes PX and are configured to be formed simultaneously with the formation of the pixel electrodes PX. This provision is made to avoid the increase of manufacturing man-hours.

In this case, the conductive layer CB is formed on the gate signal line GL in a relatively largely spaced-apart manner from the thin film transistor TFT and a width of the conductive layer CB is also set relatively small. This is because that each conductive layer CB is formed to stride over only one gate signal line GL and hence, even with the above-mentioned width, the connection with each counter electrode CT can be ensured without any drawbacks in terms of capacitance as well as electrically.

Further, on the surface of the transparent substrate SUB1 on which the pixel electrodes PX and the conductive layers CB are formed, an orientation film AL is formed and the initial orientation direction of the molecules of liquid crystal which are directly brought into contact with the orientation film AL can be defined by this orientation film AL.

Further, a transparent substrate SUB2 is arranged to face the transparent substrate SUB1 in an opposed manner by way of the liquid crystal LC. On a liquid-crystal-side surface of the transparent substrate SUB2, a black matrix BM is formed in a state that the black matrix BM covers the respective thin film transistors TFT and, at the same time, defines the respective pixel regions. FIG. 1A depicts opening portions of the black matrix BM in an overlapped manner.

On the surface of the transparent substrate SUB2 on which the black matrix BM is formed, color filters CF are formed in a state that the color filters CF cover the openings formed in the black matrix BM. The color filters CF are, for example, constituted of filters of respective colors consisting of red (R), green (G), blue (B), wherein, for example, the red filters are formed in common in each group of pixel regions which are arranged in parallel in the y direction, while the color filters having the arrangement of green (G), blue (B), red (R) . . . are formed in common in groups of pixel regions which are sequentially arranged close to the above-mentioned group of pixel regions in the x direction.

Further, an orientation film is formed on the transparent substrate SUB2 in a state that the orientation film also covers the color filters CF. The orientation film constitutes a film which is directly brought into contact with the liquid crystal and defines the initial orientation direction of the molecules of the liquid crystal.

The liquid crystal display device having such a constitution is configured such that the counter voltage signal lines CL are formed every one other pixel in the y direction thus reducing the number of counter voltage signal lines CL. Further, the supply of the counter voltage signal to the counter electrodes CT of the pixels to which the counter voltage signal line CL is not provided is performed by the conductive layers CB which are connected with the counter electrodes CT and the counter electrodes CT of the pixels to which the counter voltage signal line CL is provided in a state that the conductive layers stride over the gate signal line GL.

Due to such a constitution, it is possible to reduce the intersecting capacitance of the drain signal line DL with the counter voltage signal line CL without deteriorating the driving of the pixels.

Embodiment 2

Figure 2A:
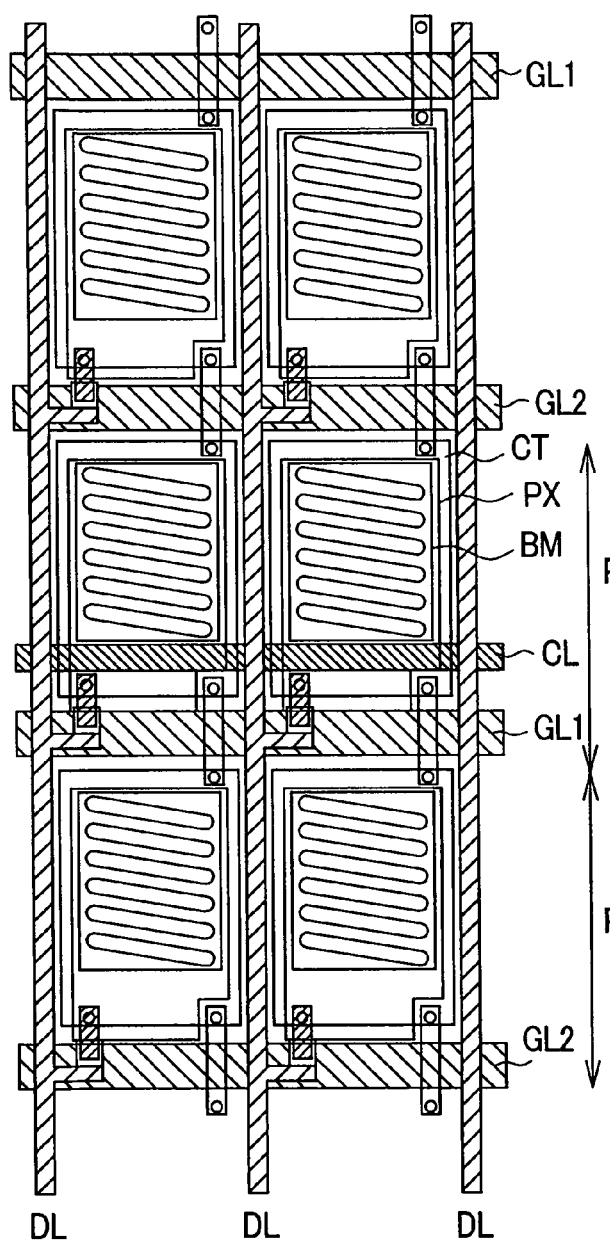
FIG. 2A is a constitutional view showing one embodiment of the constitution of the pixel of the liquid crystal display device according to the present invention.

FIG. 2A is an explanatory view showing another embodiment of the liquid crystal display device according to the present invention. Although the drawing shows the constitution which is substantially equal to the constitution shown in FIG. 1, the driving method is modified so as to reduce the power consumption.

In general, so-called n-dot inversion driving (driving which inverts the polarity of the video signal with respect to the counter electrode CT for every n pieces of gate signal lines GL) can decrease the number of the inversion of the polarity of the video signal and hence, the power consumption can be reduced.

However, between the first pixel and the next pixel whose polarities are inverted, there arises the difference in the rise of the video signal and hence, there arises a drawback that a writing ratio of the initial pixel becomes worse than a writing ratio of the next pixel and hence, the brightness irregularities are liable to be easily generated.

Accordingly, by arranging the counter voltage signal line CL corresponding to the initial pixel in the n-dot inversion, the difference is generated in the stability of the common potential between the first pixel and the succeeding pixels in the n-dot inversion so as to approximate the writing ratios to each other.

That is, by arranging the counter voltage signal line CL in the pixel which exhibits the poor writing ratio thus stabilizing the common potential, the writing ratio of the pixel can be enhanced.

Then, by providing no counter voltage signal line CL to other pixels, so as to lower the stability of the common potential of other pixels than the stability of the common potential of the preceding pixel, the writing ratios can be lowered. Accordingly, the difference in the writing ratio between the first pixel and next pixel in the n-dot inversion can be decreased and hence, it is possible to have an advantageous effect that the reduction of the power consumption can be realized and the lowering of image quality (brightness irregularities) in such writing can be enhanced compared to the prior art.

In FIG. 2A, from the upper portion to the lower portion in the drawing, the pixel which is not provided with the counter voltage signal line CL, the pixel which is provided with the counter voltage signal line CL, and the pixel which is not provided with the counter voltage signal line CL are sequentially arranged. These pixels are alternately arranged hereinafter. Assuming the pixel in which the counter voltage signal line CL is arranged as the pixel (1) and the pixel in which the counter voltage signal line CL is not arranged as the pixel (2), the pixel (1) and the pixel (2) are alternately arranged. When the scanning of the gate signal lines GL are sequentially performed from the upper side to the lower side in the drawing, the video signal which is supplied to the pixel (1) and the pixel (2) assumes the positive polarity and, thereafter, the video signal which is supplied to the next pixel (1) and the pixel (2) assumes the negative polarity. That is, the pixels are driven such that the video signal is supplied to the pixels while sequentially changing the polarity thereof.

Figure 2B:
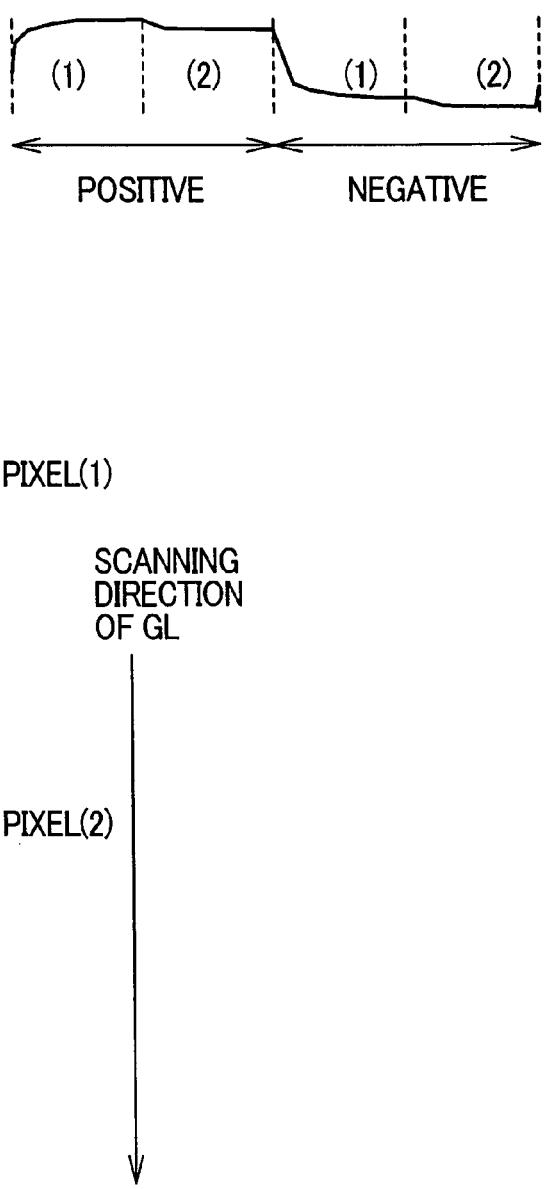
FIG. 2B is a constitutional view showing a driving method of the liquid crystal display device.

FIG. 2B shows such a timing chart. Since the polarity of the signal is changed over in the pixel (1), a change quantity of the potential of the video signal in the pixel (1) is more remarkable than the corresponding change quantity of the potential of the video signal in the pixel (2). That is, in the pixel (1), the writing ratio of the TFT which exhibits a value higher than the writing ratio of the TFT in the pixel (2) is required. Accordingly, by arranging the counter voltage signal line CL in the pixel (1), the difference between the voltages which are written in the pixel electrodes PX of the pixel (1) and the pixel (2) is reduced. Although the pixel (1) and the pixel (2) are alternately arranged in FIG. 2A, the pixels may be arranged with a unit which is constituted of one pixel (1) and a plurality of pixels (2). In this case, it is desirable to drive the pixels such that the polarity is changed over in accordance with the pixel unit consisting of the total number of units. Due to such driving, it is possible to arrange the pixels (1) at portions where the polarity is changed over.

Embodiment 3

Figure 3:
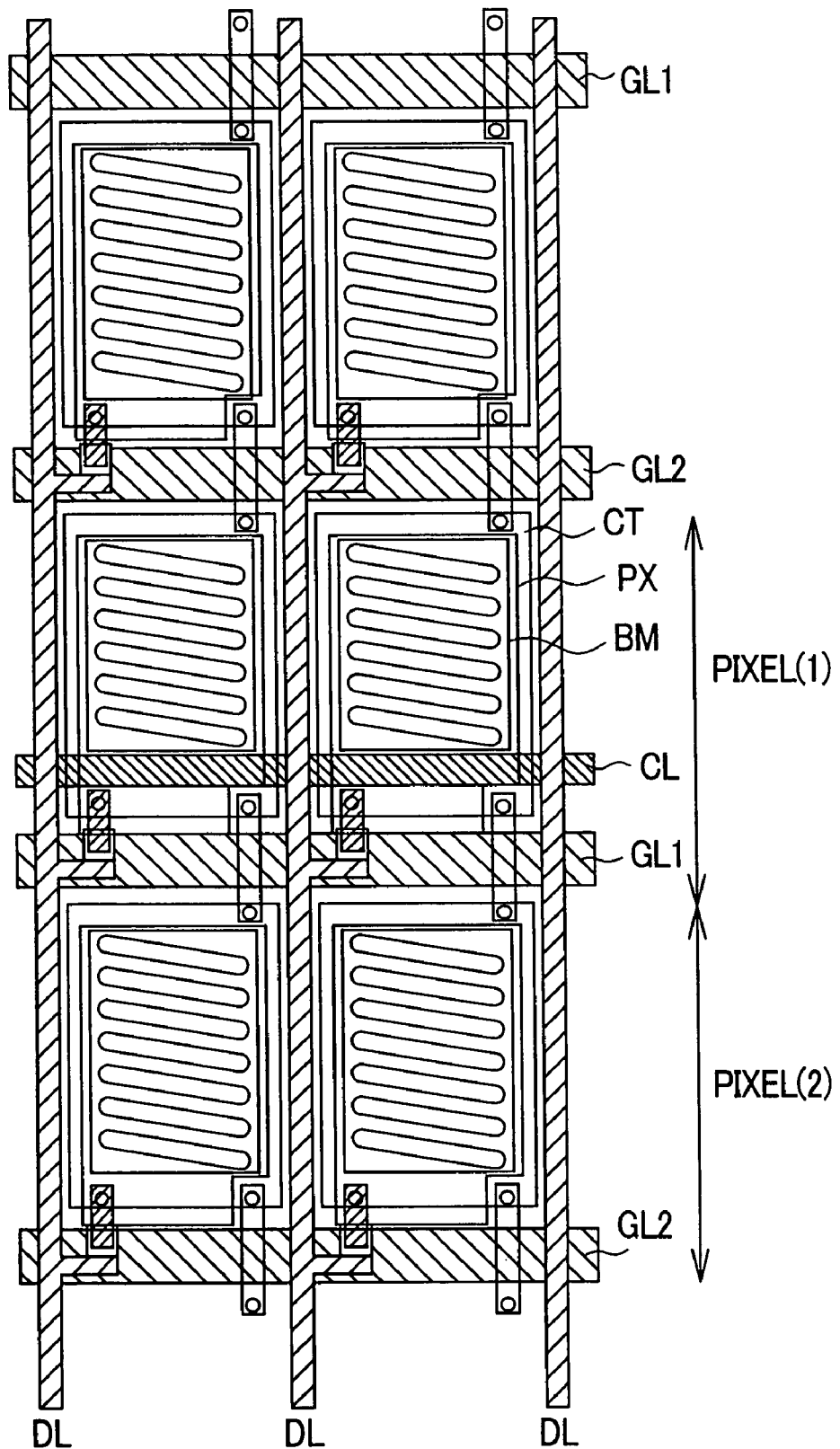
FIG. 3 is a constitutional view showing another embodiment of the constitution of the pixel of the liquid crystal display device according to the present invention.

FIG. 3 is a plan view showing another embodiment of the pixel of the liquid crystal display device according to the present invention. Compared to the case shown in FIG. 1A, an area of the pixel region in which the counter voltage signal line CL is not formed is set larger than an area of the pixel region in which the counter voltage signal line CL is formed. With respect to other constitution, the embodiment 3 has the substantially same constitution as the embodiments 1 and 2.

Due to such a constitution, an area of the opening portion of the black matrix BM which substantially functions as the pixel in the pixel region where the counter voltage signal line CL is not formed is set larger than the corresponding area of the opening portion of the black matrix BM in the pixel region in which the counter voltage signal line CL is formed.

Further, due to such a constitution, the number of pixel electrodes PX (or the number of slits) which are viewed with naked eyes in the inside of the opening of the black matrix BM formed in the pixel region which is not provided with the counter voltage signal line CL is set larger than the corresponding number of pixel electrodes PX or the number of slits in the pixel region which is provided with the counter voltage signal line CL. To set the brightness per unit area in respective pixels equal, it is necessary to set an interval of respective pixel electrodes PX which are constituted of a group of electrodes equal and hence, such a constitution is adopted. This embodiment is provided for increasing the so-called numerical aperture corresponding to a region which the counter voltage signal line CL occupies in the pixel region which is not provided with the counter voltage signal line CL.

Further, as the color filters CF, the green (G) filter is used in the pixel in which the counter voltage signal line CL is formed, while the red (R) filter is used in either one of the upper-side pixel and the lower-side pixel in the y direction in the drawing and the blue (B) filter is used in another pixel.

This is because that by allocating the color filter CF of green (G) to the pixel which has the smaller numerical aperture compared to other pixels, it is possible to favorably obtain the mixing of three primary colors.

Here, with respect to the color filters CF, it is needless to say that, as usual, the color filters having the same color which are common in respective pixels arranged along the y direction are used, while the color filters of red (R), green (G), blue (B), for example are sequentially arranged along the x direction.

Embodiment 4

Figure 4:
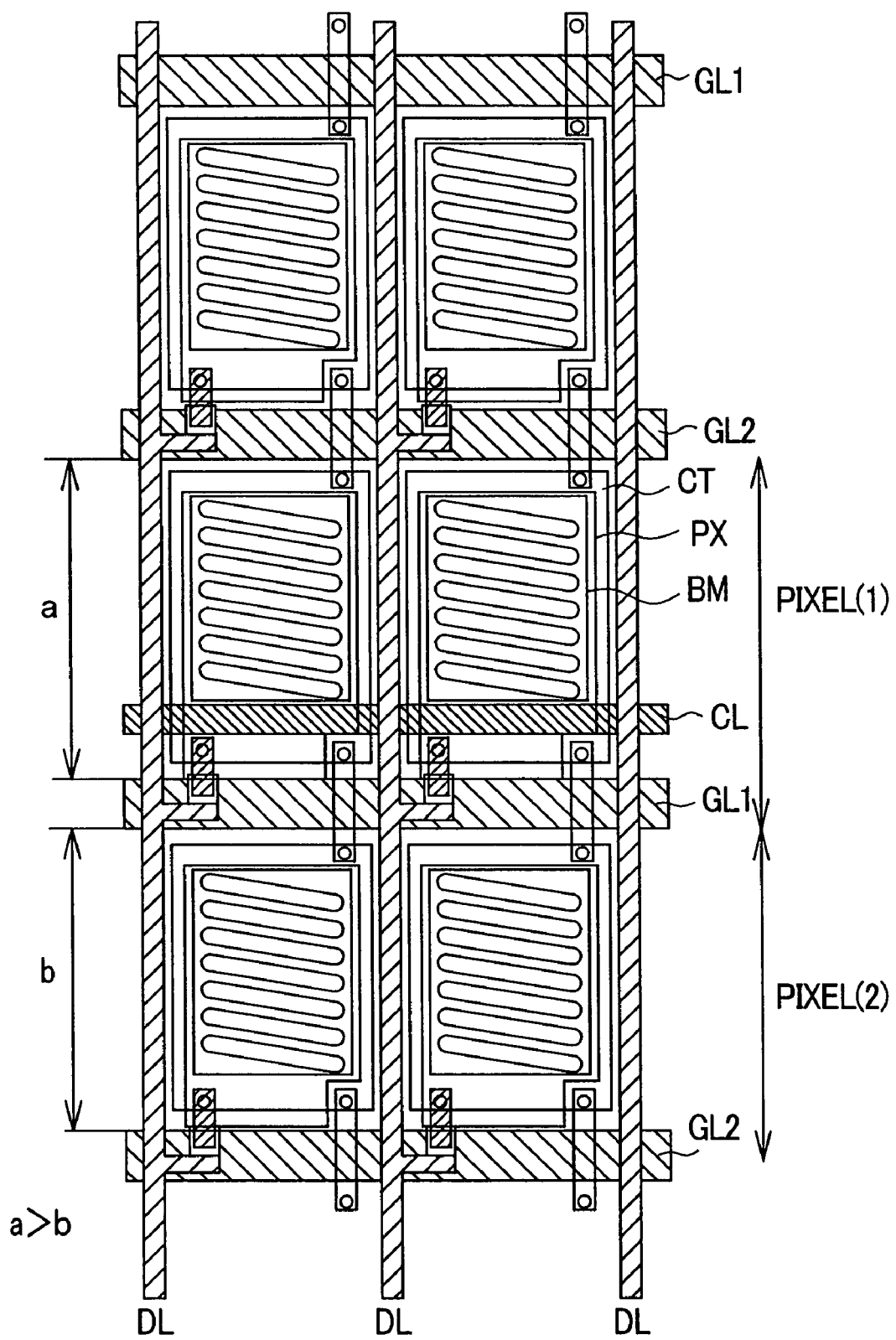
FIG. 4 is a constitutional view showing another embodiment of the constitution of the pixel of the liquid crystal display device according to the present invention.

FIG. 4 is a plan view showing another embodiment of the pixel of the liquid crystal display device according to the present invention. Compared to the case shown in FIG. 1A, an area (a width in the y direction) of the pixel region in which the counter voltage signal line CL is formed is set larger than an area of the pixel region in which the counter voltage signal line CL is not formed. With respect to other constitution, the embodiment 4 has the substantially same constitution as the embodiments 1 to 3.

Further, an area of the numerical aperture of the black matrix BM of the pixel region in which the counter voltage signal line CL is formed is set equal to an area of the numerical aperture of the black matrix BM of the pixel region in which the counter voltage signal line CL is not formed. This provision is provided for making the brightness of the respective pixels uniform.

Further, due to such a constitution, it is possible to have an advantageous effect that the influence of the electric field from the drain signal line DL to the counter electrode CT of the pixel arranged close to the drain signal line DL can be made uniform along the drain signal line DL. That is, with respect to the pixel in which the counter voltage signal line CL is formed, although the drain signal line DL which is arranged close to the counter voltage signal line CL is formed with a relatively long length, the counter electrode CT of the pixel is directly connected with the counter voltage signal line CL and hence is electrically made stable.

On the other hand, to the counter electrode CT of the pixel in which the counter voltage signal line CL is not formed, the signal is supplied from the counter electrode CT of the pixel in which the counter electrode signal line CL is formed via the conductive layer CB and hence, the signal is not electrically stable. However, the drain signal line DL which is arranged close to the pixel is made short correspondingly and hence, the irregularities of the influence of the electric field can be suppressed.

Embodiment 5

Figure 5:
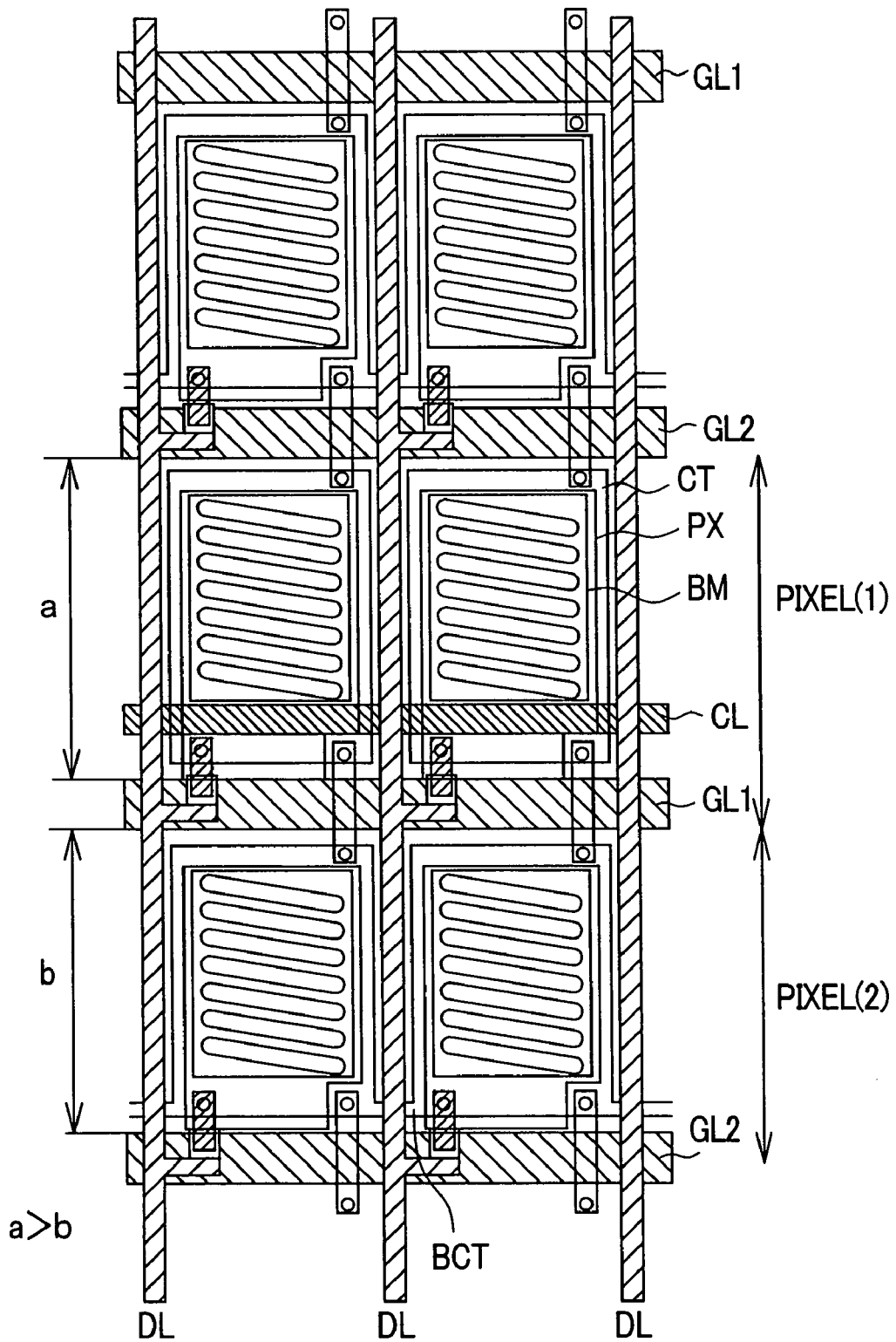
FIG. 5 is a constitutional view showing another embodiment of the constitution of the pixel of the liquid crystal display device according to the present invention.

FIG. 5 is a plan view showing another embodiment of the pixel of the liquid crystal display device according to the present invention. Compared to the case shown in FIG. 4, in the pixel which is not provided with the counter voltage signal line CL, the counter electrode CT is electrically connected with the counter electrode CT of another pixel arranged close to the pixel in the x direction via a conductive layer BCT which intersects a portion of the drain signal line DL. Other constitutions are equal to the corresponding constitutions described in the embodiment 1 to 4.

This embodiment is provided for making the potential of the counter electrode CT of the pixel which is not provided with the counter voltage signal line CL more stable.

Embodiment 6

Figure 6:
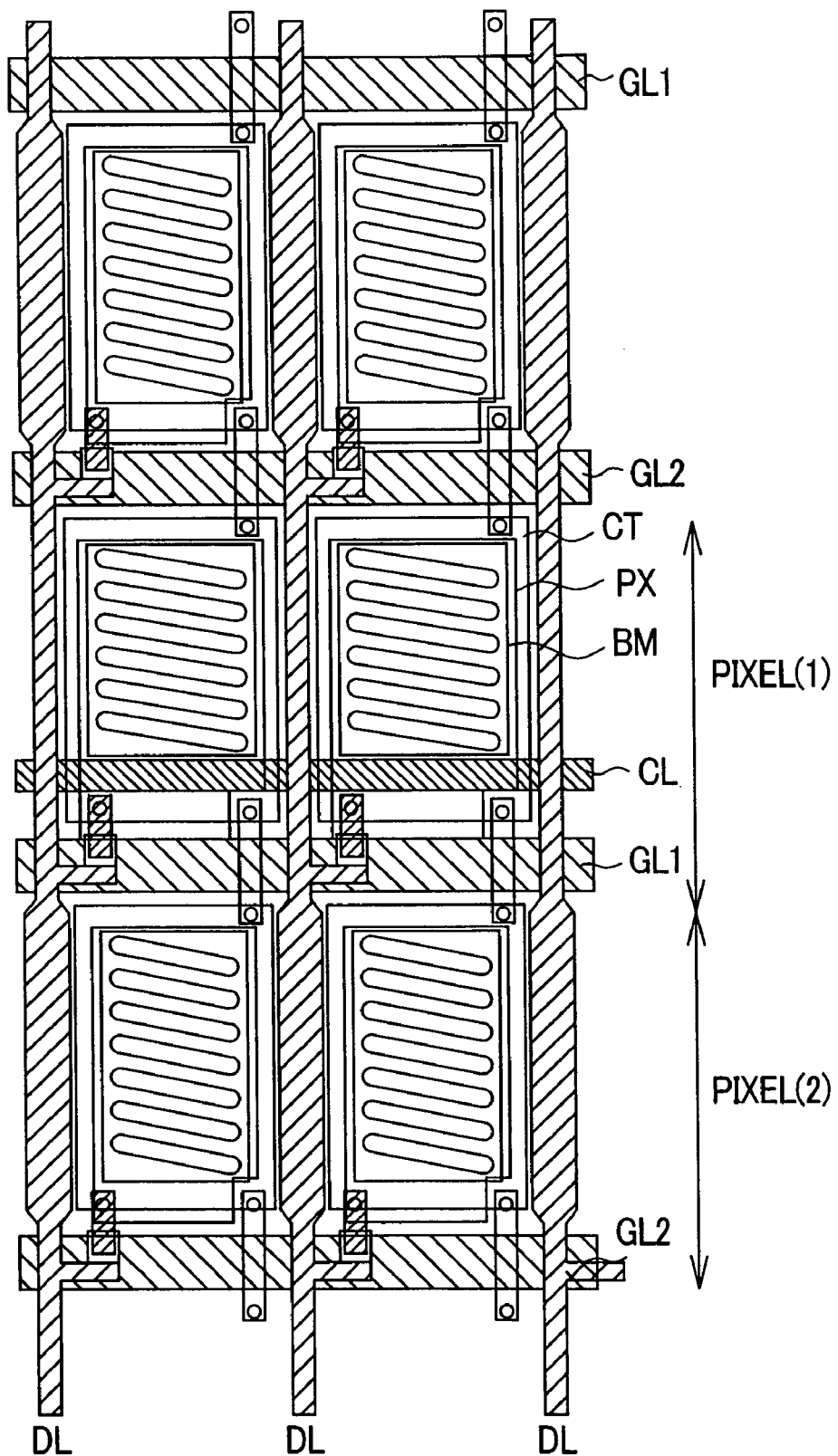
FIG. 6 is a constitutional view showing another embodiment of the constitution of the pixel of the liquid crystal display device according to the present invention.

FIG. 6 is a plan view showing another embodiment of the pixel of the liquid crystal display device according to the present invention. Compared with the case shown in FIG. 2, with respect to the pixel in which the counter voltage signal line CL is formed, a line width of the drain signal line DL which is arranged close to the pixel is set small, while with respect to the pixel in which the counter voltage signal line CL is not formed, a line width of the drain signal line DL which is arranged close to the pixel is set large. Other constitutions are substantially equal to the constitutions of the embodiments 1 to 5.

Here, in the case shown in FIG. 2, a spaced-apart distance of the respective gate signal lines GL is set equal and the pixel of the portion where the counter voltage signal line CL is formed is configured to substantially narrow the pixel region in the y direction in the drawing than other pixels due to a region that the counter voltage signal line CL occupies.

To the contrary, in this embodiment, with respect to the pixel of the portion where the gate signal line GL is not formed, the substantial pixel region is narrowed in the x direction in the drawing by an amount corresponding to the increase of the line width of the drain signal line DL. Eventually, it is possible to make all of respective pixels have the substantially uniform area.

That is, the substantial area of the pixel which is determined based on the opening area of the black matrix BM differs in an aspect ratio between the portion of the pixel where the counter voltage signal line CL is formed and the portion of the pixel where the counter voltage signal line CL is not formed. That is, the substantial area has the large lateral width and the small longitudinal width in the portion of the pixel where the counter voltage signal line CL is formed, while the substantial area has the small lateral width and the large longitudinal width in the portion of the pixel where the counter voltage signal line CL is not formed. However, this embodiment can set these areas equal.

Further, by providing the portion which has the large width to the drain signal line DL, it is possible to reduce an electric resistance value of the whole drain signal line DL and hence, the distortion of the waveform of the video signal which is supplied to the drain signal line DL can be reduced.

Embodiment 7

Figure 8:
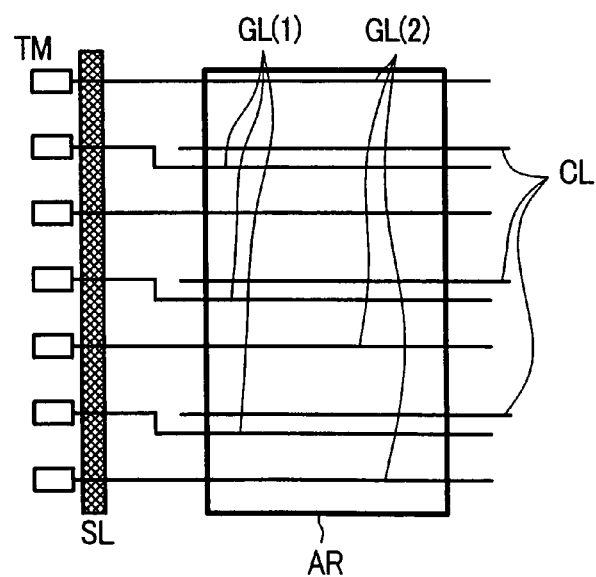
FIG. 8 is a view showing one embodiment of the constitution of the vicinity of a terminal portion of a gate signal line of the liquid crystal display device according to the present invention.

FIG. 8 is a view showing another embodiment of the liquid crystal display device according to the present invention. Respective gate signal lines GL which are formed on the liquid crystal display part AR extend and project from the liquid crystal display part AR and have portions which reach terminals TM thereof. Here, symbol SL in FIG. 8 indicates a sealing material which is formed between the transparent substrate SUB1 and another transparent substrate SUB2 which is arranged to face the transparent substrate SUB1 in an opposed manner and seals the liquid crystal filled in the portion including the liquid crystal display part AR.

FIG. 8 shows the constitution which is provided on a premise that a distance between a pair of gate signal lines GL which sandwich a group of pixels extending in the x direction in which the counter voltage signal line CL is formed is set wider than a distance between a pair of gate signal lines GL which sandwich a group of pixels extending in the x direction in which the counter voltage signal line CL is not formed.

In this case, portions of the respective gate signal lines GL have bent portions at portions which extend over the liquid crystal display part AR (inside the sealing material SL) and, after passing the bent portions, all gate signal lines GL have the equal interval and are connected with the terminals TM.

The gate signal lines GL which include the bent portions are, for example, selected every one other line and the extending portions are formed such that, after passing the bent portions, the extending portions extend to the terminals TM while maintaining the equal interval with other neighboring gate signal lines GL.

Since the terminals TM are connected with pads of the gate driver G-Drv which is constituted of a semiconductor device, the spaced-apart distance of the terminals TM is set equal. Due to such a constitution, the above-mentioned provision becomes necessary. Accordingly, it is possible to have an advantageous effect that, in the inspection of the disconnection of the gate signal lines GL or the like, it is possible to use an inspection device in which a spaced-apart distance between probe terminals is preliminarily set without modification.

Figure 9:
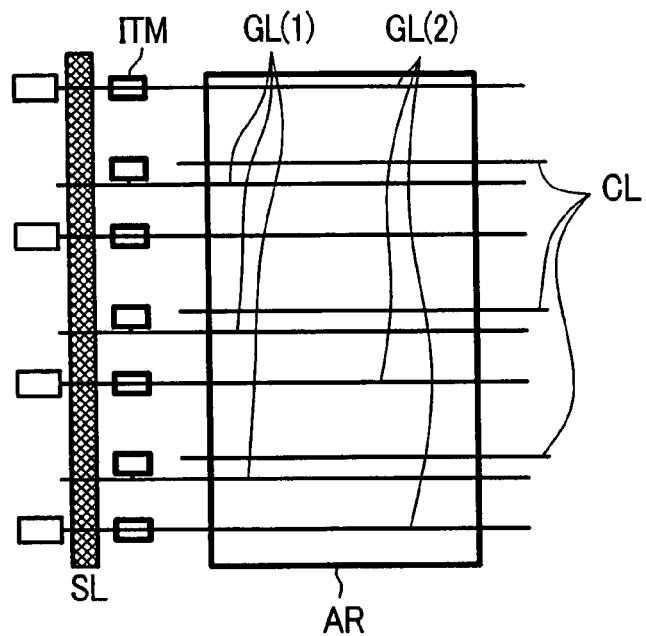
FIG. 9 is a view showing another embodiment of the constitution of the vicinity of a terminal portion of a gate signal line of the liquid crystal display device according to the present invention.

FIG. 9 is, in the same manner as FIG. 8, shows a case in which a distance between a pair of gate signal lines GL which sandwich a group of pixels extending in the x direction in which the counter voltage signal line CL is formed is set wider than a distance between a pair of gate signal lines GL which sandwich a group of pixels extending in the x direction in which the counter voltage signal line CL is not formed, wherein the respective gate signal lines GL straightly and directly extend over the liquid crystal display part AR and detection terminals ITM which detect disconnections or the like of the gate signal lines GL are provided between the liquid crystal display part AR and the sealing material SL.

In this case, although the detection terminals ITM are positioned on lines of the gate signal lines GL every one other, remaining detection terminals ITM are positioned to be slightly displaced from the gate signal lines GL and wiring layers which connect the detection terminals ITM with the gate signal lines GL are provided.

This provision is made to cope with the situation that in spite of the fact that the respective gate signal lines GL are not arranged at an equal interval, it is necessary to arrange the detection terminals ITM at an equal interval.

Embodiment 8

Figure 10:
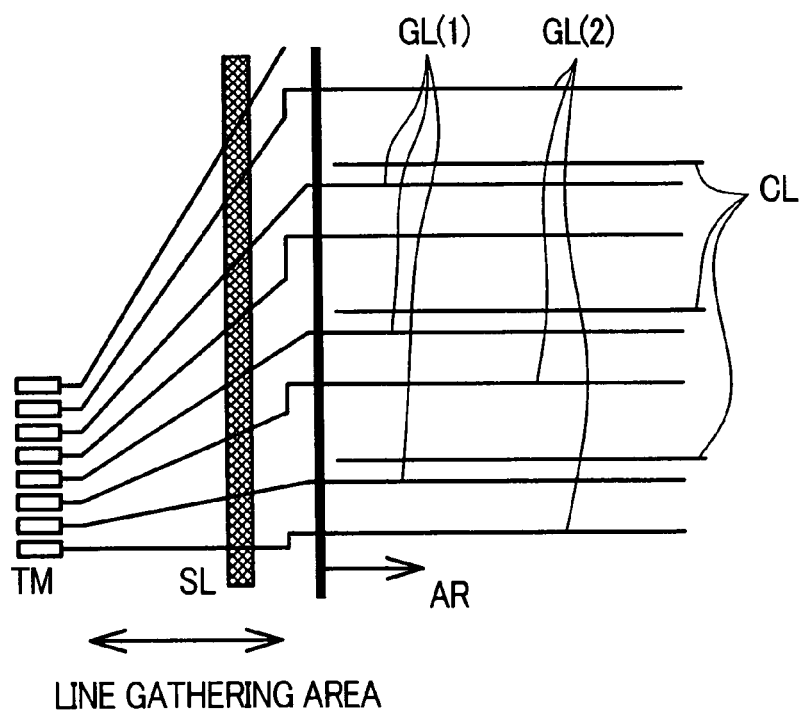
FIG. 10 is a view showing another embodiment of the constitution of the vicinity of a terminal portion of a gate signal line of the liquid crystal display device according to the present invention.

FIG. 10 is a plan view showing another embodiment of the liquid crystal display device according to the present invention and shows the constitution in which respective gate signal lines GL which are formed on the liquid crystal display part AR extend and project from the liquid crystal display part AR and the extending portions reach the terminals TM.

Also in this case, a distance between a pair of gate signal lines GL which sandwich a group of pixels extending in the x direction in which the counter voltage signal line CL is formed is set wider than a distance between a pair of gate signal lines GL which sandwich a group of pixels extending in the x direction in which the counter voltage signal line CL is not formed.

Further, the respective gate signal lines GL which extend over the liquid crystal display part AR have an interval thereof narrowed such that the gate signal lines GL are gathered with each other in the vicinity of a sealing material SL and, thereafter, are connected with the terminals TM which is formed outside the sealing material SL.

This provision is made to cope with the fact that the circuit which is connected with the terminals is constituted of a semiconductor device, for example, and an interval of the bumps is set narrower than an interval of the respective gate signal lines GL.

In this case, portions of the respective gate signal lines GL include bent portions at portions thereof which extend over the liquid crystal display part AR (inside the sealing material SL) and extend to the terminals TM after passing the bent portions.

The gate signal lines GL which are provided with the bent portions are formed in a pattern that the gate signal lines GL are selected for every one other, for example, and the extending portions after passing through the bent portions are gathered while maintaining the equal interval with other neighboring gate signal line GL.

The above-mentioned respective embodiments may be used in a single form or in combination. It is because that the advantageous effects of the respective embodiments can be obtained individually or synergistically.

Further, all of the above-mentioned embodiments are directed to the case in which the counter voltage signal lines CL are formed every one other with respect to the pixel groups each consisting of pixels arranged in parallel in the extending direction. However, it is needless to say that the present invention is not limited to such a constitution and the counter voltage signal lines CL are formed every two other, every three other or every number more than three other.

What is claimed is:

1. A liquid crystal display device comprising:
   first and second substrates with a liquid crystal layer therebetween;
   a plurality of gate signal lines which are formed on the first substrate and are extended in the first direction;
   a plurality of drain signal lines which are formed on the first substrate and are extended in the second direction, each one of the drain signal lines has a wide portion and a narrow portion; and
   a plurality of pixel regions which are formed on the first substrate in a state that each pixel region includes a switching device, a pixel electrode which is connected with the drain signal line and a counter electrode, wherein
   the counter electrode is formed on the substrate side with respect to the pixel electrode by way of an insulation film and is formed every pixel,
   at least one of the pixel regions comprises first pixels and second pixels, wherein only the first pixels have a counter voltage signal line which extends in the first direction, and is arranged only in the first pixels and the counter voltage signal line is connected with the counter electrodes in the inside of the first pixels, the first pixels only are associated with one of the narrow portions of the drain signal line and the second pixels only are associated with one of the wide portions of the drain signal line;
   the counter electrodes of the first pixels and the counter electrodes of the second pixels are electrically connected with each other using conductive layers which are formed in a state that the conductive layers stride over the gate signal lines, and
   wherein a substantial portion of the drain signal line of the second pixels is the wide portion, a substantial portion of the drain signal of the first pixels is the narrow portion, the width of the wide portion is wider than the width of the narrow portion, and the wide portion of the drain signal line of the second pixels is formed at the position that does not overlap the gate signal line.

2. A liquid crystal display device according to claim 1, wherein the first pixels and the second pixels are alternately arranged in the second direction.

3. A liquid crystal display device according to claim 1, wherein the extending direction of the pixel electrodes or slits formed in the pixel electrodes assumes the direction which makes an acute angle with respect to the gate signal lines.

4. A liquid crystal display device according to claim 1, wherein the number of pixel electrodes in the first pixel or the number of slits formed in the pixel electrode is smaller than the number of pixel electrodes in the second pixel or the number of slits formed in the pixel electrode.

5. A liquid crystal display device according to claim 1, wherein the polarity of a drain signal supplied to the drain signal lines differs between a range from the first pixel to a portion of the second pixel immediately before the next first pixel and a range from the next first pixel to a portion of the second pixel immediately before the still next first pixel.

* * * * *